(12) United States Patent
Nonaka et al.

(10) Patent No.: US 12,261,985 B2
(45) Date of Patent: Mar. 25, 2025

(54) INFORMATION PROCESSING APPARATUS, NON-TRANSITORY COMPUTER READABLE MEDIUM STORING PROGRAM, AND INFORMATION PROCESSING METHOD FOR OPTIMIZING RESOURCE ALLOCATION AND DATA CONSISTENCY

(71) Applicant: FUJIFILM Business Innovation Corp., Tokyo (JP)

(72) Inventors: Hiroshige Nonaka, Kanagawa (JP); Satoshi Watanabe, Kanagawa (JP); Masato Sugii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 326 days.

(21) Appl. No.: 17/721,360

(22) Filed: Apr. 15, 2022

(65) Prior Publication Data
US 2023/0106262 A1 Apr. 6, 2023

(30) Foreign Application Priority Data
Oct. 1, 2021 (JP) .................................. 2021-162872

(51) Int. Cl.
*H04N 1/00* (2006.01)
*H04N 1/32* (2006.01)
*H04N 1/44* (2006.01)

(52) U.S. Cl.
CPC ....... *H04N 1/0097* (2013.01); *H04N 1/00244* (2013.01); *H04N 1/00973* (2013.01); *H04N 1/32096* (2013.01); *H04N 1/4433* (2013.01); *H04N 2201/0012* (2013.01)

(58) Field of Classification Search
None
See application file for complete search history.

(56) References Cited

U.S. PATENT DOCUMENTS

| 10,015,356 B2 | 7/2018 | Hori | |
| 2015/0077776 A1* | 3/2015 | Hori | H04N 1/3255 358/1.13 |
| 2018/0107956 A1* | 4/2018 | Yamada | H04L 67/10 |

FOREIGN PATENT DOCUMENTS

JP 6264800 1/2018

\* cited by examiner

*Primary Examiner* — Andrew H Lam
(74) *Attorney, Agent, or Firm* — JCIPRNET

(57) ABSTRACT

An information processing apparatus includes a processor configured to: as a first job, perform connection to an external server that is enable to be connected from the information processing apparatus, instruct the external server to execute processing by designating shared information held in a storage device that is enable to be shared by plural jobs, hold the designated shared information in a primary storage section, and release a resource used in the first job, as a second job different from the first job, acquire a result of the processing by the external server, and execute processing using the shared information designated in the first job and held in the primary storage section, and change the shared information held in the storage device and not changing the shared information held in the primary storage section in a case where an operation of changing the shared information is performed between execution of the first job and start of the second job.

7 Claims, 10 Drawing Sheets

INFORMATION PROCESSING APPARATUS, NON-TRANSITORY COMPUTER READABLE MEDIUM STORING PROGRAM, AND INFORMATION PROCESSING METHOD FOR OPTIMIZING RESOURCE ALLOCATION AND DATA CONSISTENCY

CROSS-REFERENCE TO RELATED APPLICATIONS

This application is based on and claims priority under 35 USC 119 from Japanese Patent Application No. 2021-162872 filed Oct. 1, 2021.

BACKGROUND

(i) Technical Field

The present invention relates to an information processing apparatus, a non-transitory computer readable medium storing a program, and an information processing method.

(ii) Related Art

In data processing by an information processing apparatus, a part of the processing in one job may be executed by an external apparatus. In this case, for example, the processing is executed while exchanging data and a processing result between the apparatuses according to individual processing included in the job and a workflow in which an execution subject of each processing is defined.

JP6264800B discloses an information processing system in which workflow information that defines the order of a plurality of processing and the information processing apparatus that is an execution subject of each of the plurality of processing defines one information processing apparatus selected from a plurality of information processing apparatuses as the execution subject, each of the plurality of processing defined in the execution subject and defined in the workflow information is executed by the information processing apparatus defined as the execution subject in the defined order, and processing, in which the execution subject in the workflow information is one information processing apparatus selected among the plurality of information processing apparatuses, is executed by the one information processing apparatus selected according to a predetermined determination condition.

SUMMARY

In a case where a part of processing in one job executed by an information processing apparatus is executed by an external apparatus, the job related to the processing is retained in the information processing apparatus until the processing by the external apparatus ends, so that a resource, such as a memory, is wasted. Therefore, it is conceivable that, among operations of the information processing apparatus, an operation before the processing by the external apparatus is started and an operation after the processing by the external apparatus ends are executed as different jobs, and the resource is released after executing a previous job. However, in a case where the information shared by the jobs is changed in the information processing apparatus between execution of the previous job and start of a subsequent job, inconsistency may occur in a series of operations by the jobs.

Aspects of non-limiting embodiments of the present disclosure relate to an information processing apparatus, a non-transitory computer readable medium storing a program, and an information processing method that suppress occurrence of inconsistency in a case where information shared by previous and subsequent jobs is changed after the previous job is executed, compared to a configuration in which operations before and after processing executed by an external apparatus are executed as different jobs in a case where a part of a series of processing in the information processing apparatus is executed by the external apparatus and information which is set when each job is executed is used as information shared in the jobs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to:

as a first job, perform connection to an external server that is enable to be connected from the information processing apparatus, instruct the external server to execute processing by designating shared information held in a storage device that is enable to be shared by a plurality of jobs, hold the designated shared information in a primary storage section, and release a resource used in the first job, as a second job different from the first job, acquire a result of the processing by the external server, and execute processing using the shared information designated in the first job and held in the primary storage section, and change the shared information held in the storage device and not change the shared information held in the primary storage section in a case where an operation of changing the shared information is performed between execution of the first job and start of the second job.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

System Configuration

Figure 1:
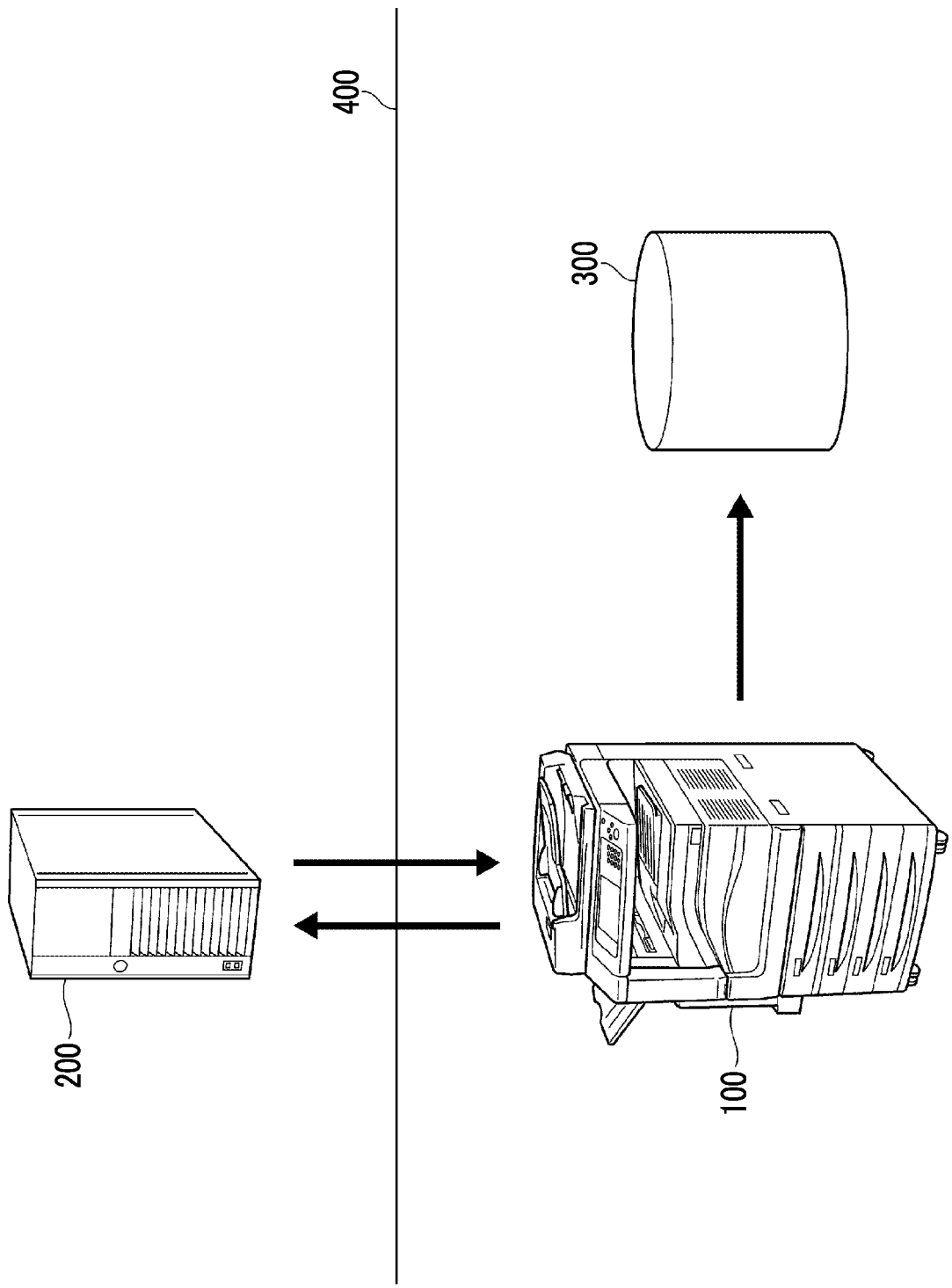
FIG. 1 is a diagram showing an overall configuration of an information processing system according to the present exemplary embodiment.

FIG. 1 is a diagram showing an overall configuration of an information processing system according to the present exemplary embodiment. The information processing system of the present exemplary embodiment includes an information processing apparatus 100, a processing execution server 200, and a management server 300. The information processing apparatus 100 is an apparatus that executes data processing. The information processing apparatus 100 may include, in addition to a personal computer, various apparatuses that is enable to be connected to the processing execution server 200 and the management server 300, which are external apparatuses, via a function of processing data and a network.

The processing execution server 200 is a server that acquires data from the information processing apparatus 100 to execute processing. The processing execution server 200 is a server provided over the network, may be configured as a single server machine, or may be realized by a virtual server or a cloud server that realizes a function as the processing execution server 200 by a plurality of servers. The processing execution server 200 is an example of an external server. The management server 300 is a storage server that stores and manages data. The management server 300 stores data of processing results by the information processing apparatus 100 and the processing execution server 200. The management server 300 is an example of the external apparatus.

The information processing apparatus 100, the processing execution server 200, and the management server 300 are connected via the network. In the configuration shown in FIG. 1, a firewall 400 is set between the information processing apparatus 100, the management server 300, and the processing execution server 200, and the information processing apparatus 100 and the management server 300 are protected by the firewall 400. Therefore, the information processing apparatus 100 can access the processing execution server 200 but the processing execution server 200 cannot access the information processing apparatus 100 and cannot access the management server 300 over the firewall 400.

As described above, the information processing apparatus 100 may be realized using various apparatuses that perform data processing. As an example, a case is considered where the information processing apparatus 100 is realized by an image processing apparatus. Hereinafter, the image processing apparatus as the information processing apparatus 100 will be described as an "image processing apparatus 100" with a reference numeral of the information processing apparatus 100. In the system shown in FIG. 1, the image processing apparatus 100 requests the processing execution server 200 to perform a part of processing for data such as an image to be processed. The processing execution server 200 performs processing for the image acquired from the image processing apparatus 100. Then, in a case where the processing execution server 200 accepts the request from the image processing apparatus 100, the processing execution server 200 returns a processing result for the image to the image processing apparatus 100. The image processing apparatus 100 sends data of the processing result acquired from the processing execution server 200 to the management server 300.

A specific example of an aspect, in which the image processing apparatus 100 and the processing execution server 200 are used, is considered. For example, the image processing apparatus 100 reads an image of a form such as an invoice or a receipt, and requests the processing execution server 200 to analyze the image of the form. Further, the image processing apparatus 100 may acquire electronic data of the form and request the processing execution server 200 to analyze the form based on the electronic data. Hereinafter, the image data and the electronic data of the form are collectively referred to as "form data". The processing execution server 200 analyzes the form data acquired from the image processing apparatus 100, and performs data processing according to content of the form recognized based on an analysis result. Further, the processing execution server 200 specifies a storage destination of the analysis result and a data processing result based on the content of the form. Then, the processing execution server 200 returns the analysis result of the form data and the data processing result according to the content of the form in response to the request from the image processing apparatus 100. The image processing apparatus 100 sends and stores the analysis result and the data processing result acquired from the processing execution server 200 to the management server 300.

Configuration of Information Processing Apparatus 100

Figure 2:
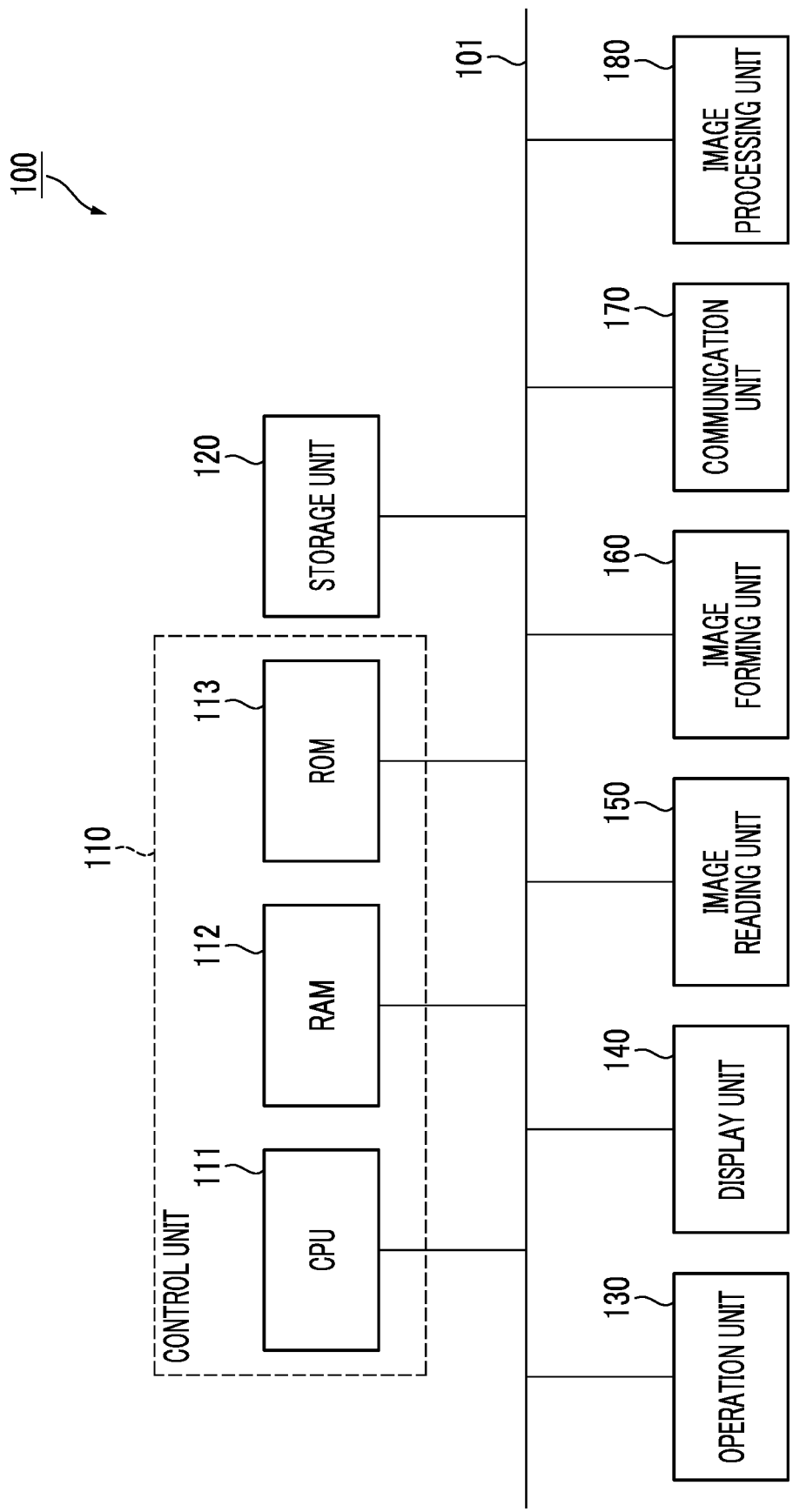
FIG. 2 is a diagram illustrating a configuration of an image processing apparatus.

FIG. 2 is a diagram illustrating a configuration of the image processing apparatus 100. Here, the configuration of the image processing apparatus 100 as an example of the information processing apparatus 100 will be described. The image processing apparatus 100 includes a control unit 110, a storage unit 120, an operation unit 130, a display unit 140, an image reading unit 150, an image forming unit 160, a communication unit 170, and an image processing unit 180. Each of the functional units is connected to a bus 101, and exchanges data via the bus 101.

The control unit 110 controls each of the functional units in the image processing apparatus 100. Further, the control unit 110 is a functional unit that executes various data processing. The control unit 110 includes a Central Processing Unit (CPU) 111 that is an arithmetic calculation section, and a Random Access Memory (RAM) 112 and a Read Only Memory (ROM) 113 that are storage sections. The RAM 112 is a main storage device (main memory) and is used as a working memory in a case where the CPU 111 performs arithmetic calculation processing. The ROM 113 holds a program and data such as a set value that is prepared in advance, and the CPU 111 directly reads the program and the data from the ROM 113 and executes processing. The program and the data are also stored in the storage unit 120. The CPU 111 reads and executes the program stored in the storage unit 120 in the RAM 112. Functions for performing various data processing and control in the image processing apparatus 100, which will be described later, are realized by executing the program by, for example, the CPU 111.

The storage unit 120 is a functional unit that stores programs and data to be executed by the CPU 111 as described above, and also stores various data, such as image data read by the image reading unit 150, generated by various operations. The storage unit 120 is realized by, for example, a storage device such as a magnetic disk device or a Solid State Drive (SSD).

The operation unit 130 is a functional unit that accepts an operation of a user. The operation unit 130 is configured with, for example, a hardware key, a touch sensor that outputs a control signal according to a position pressed or touched by a finger, or the like. The operation unit 130 may be configured as a touch panel in which a touch sensor is combined with a liquid crystal display configuring the display unit 140.

The display unit 140 is a functional unit that displays an information image that presents various information to the user, a preview image of an image to be processed, for example, to be read or to be output, an operation image to be operated by the user, and the like. The display unit 140 is configured with, for example, the liquid crystal display. The operation unit 130 and the display unit 140 may be combined to be used as a user interface section for the user to input and output information to and from the image processing apparatus 100.

The image reading unit 150 is a functional unit that optically reads an image on a document. A method for reading the image is used with, for example, a CCD method in which reflected light for light irradiating the document from a light source is reduced by a lens and by Charge Coupled Devices (CCD), or a CIS method in which the reflected light for light irradiating the document in order from a Light Emitting Diode (LED) light source is received by the Contact Image Sensor (CIS).

The image forming unit 160 is a functional unit that forms an image based on the image data on a recording material, such as paper, by using an image forming material. As a method for forming the image on the recording material, for example, an electrophotographic method is used in which toner is used as the image forming material and the image is formed by transferring the toner attached to a photoconductor to the recording material.

The communication unit 170 is a functional unit that transmits and receives a command and data to and from the external apparatus. As the communication unit 170, an interface corresponding to a communication method with the external apparatus is used. The connection with the external apparatus may be performed via the network or may be performed by direct connection. A communication line may be a wired line or a wireless line.

The image processing unit 180 is a functional unit that includes a processor as an arithmetic calculation section and a working memory, and performs image processing, such as color correction or gradation correction, on the image represented by the image data. The CPU 111 of the control unit 110 may be used as the processor, and the RAM 112 of the control unit 110 may be used as the working memory, respectively.

Transfer of Data and Procedure of Processing

Next, a transfer of data and a procedure of processing between the image processing apparatus 100 and the processing execution server 200 will be described. In the description below, the above-described form data will be described as an example of data to be processed.

The image processing apparatus 100 accesses the processing execution server 200, causes the processing execution server 200 to execute a part of processing such as analysis of the form data to be processed, and acquires the processing result. Here, the image processing apparatus 100 executes an operation of sending the form data to be processed to the processing execution server 200 and an operation of acquiring the processing result from the processing execution server 200 as different jobs. Hereinafter, the operation of sending the data to be processed to the processing execution server 200 is referred to as a first job, and the operation of acquiring the processing result from the processing execution server 200 is referred to as a second job.

By dividing the operations as different jobs, the image processing apparatus 100 can release the resource, such as a memory area, used for execution of the job and can use the resource to execute another processing until the second job is started after the first job ends. On the other hand, since the operations are divided as the different jobs, a mechanism is necessary for the image processing apparatus 100 and the processing execution server 200 to recognize that the jobs are related jobs related to an identical processing target. Here, as an example, a job ID as identification information used to identify the related job is set.

Further, the processing execution server 200 cannot access the image processing apparatus 100 over the firewall 400. Therefore, in order for the processing execution server 200 to send the processing result to the image processing apparatus 100, the image processing apparatus 100 needs to make a processing result transmission request to the processing execution server 200. Therefore, a mechanism is necessary for the image processing apparatus 100 to recognize that the processing of the processing execution server 200 is completed. Here, an operation of inquiring whether or not the processing is completed is performed from the image processing apparatus 100 to the processing execution server 200.

Figure 3:
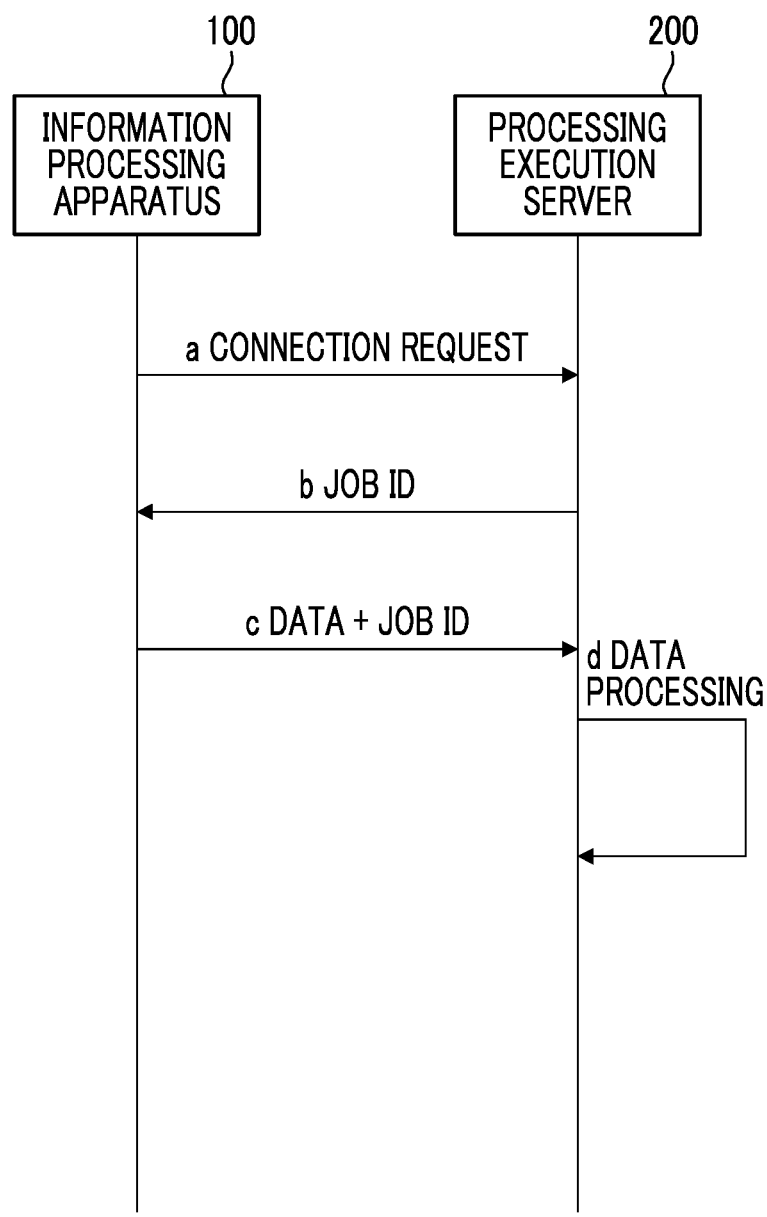
FIG. 3 is a sequence diagram showing data exchange between the image processing apparatus and a processing execution server in a first job.

FIG. 3 is a sequence diagram showing data exchange between the image processing apparatus 100 and the processing execution server 200 in the first job. First, the image processing apparatus 100 (described as "information processing apparatus" in the drawing) makes a connection request to the processing execution server 200 (a). The processing execution server 200 generates a job ID in response to the connection request, and transmits the job ID to the image processing apparatus 100 (b). In a case where the image processing apparatus 100 acquires the job ID from the processing execution server 200, the image processing apparatus 100 adds the acquired job ID to the form data to be processed and transmits the form data to the processing execution server 200 (c).

In a case where the processing execution server 200 receives the data to be processed and the job ID, the processing execution server 200 executes processing for the received form data (d). Here, the processing execution server 200 analyzes the received form data and recognizes the content of the form. Then, the processing execution server 200 executes data processing according to the content of the recognized form. Further, depending on content of the data processing, the processing execution server 200 adds information obtained by executing the data processing, as additional information, to the processing result. For example, in a case where the image processing apparatus 100 stores the processing result by the processing execution server 200 in the management server 300 and in a case where the information on the storage destination is obtained from the analysis result or the data processing result by the processing execution server 200, the information on the storage destination is added to the processing result.

Figure 4:
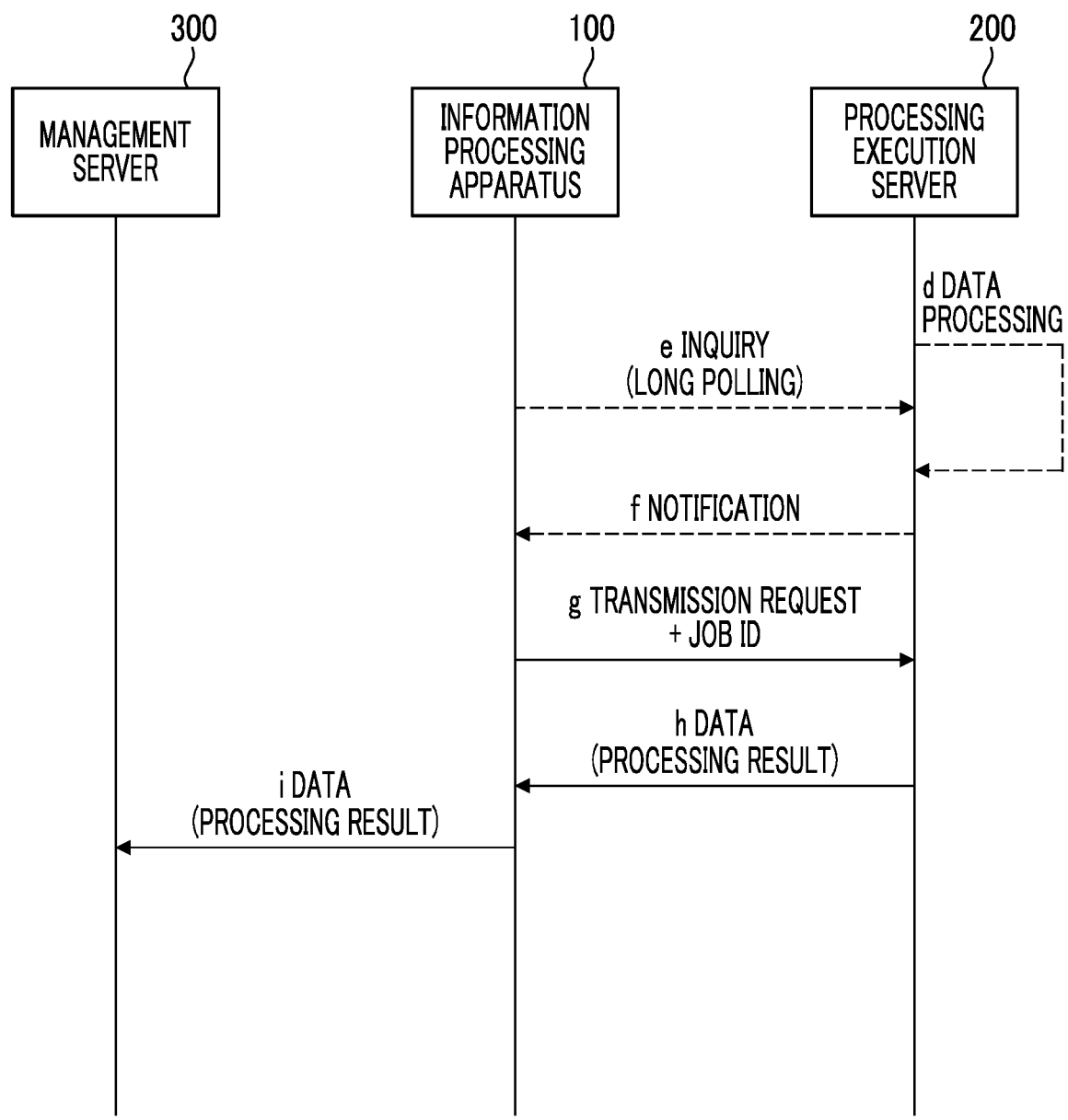
FIG. 4 is a sequence diagram showing data exchange between the image processing apparatus and the processing execution server in a second job.

FIG. 4 is a sequence diagram showing data exchange between the image processing apparatus 100 and the processing execution server 200 in the second job. After the image processing apparatus 100 (described as "information processing apparatus" in the drawing) transmits the form data to the processing execution server 200, the image processing apparatus 100 makes an inquiry to receive a notification that the processing is completed from the processing execution server 200 (e). The inquiry is made, for example, by long polling. In a case where the processing execution server 200 accepts the inquiry from the image processing apparatus 100, the processing execution server 200 responds to the inquiry and notifies the image processing apparatus 100 that the data processing is completed, after data processing (d) is completed (f).

In a case where the image processing apparatus 100 receives the notification indicating that the data processing is completed from the processing execution server 200, the image processing apparatus 100 transmits the processing result transmission request to the processing execution server 200, together with the job ID acquired in the first job (g). The processing execution server 200 returns the processing result corresponding to the job ID to the image processing apparatus 100 in response to the transmission request received from the image processing apparatus 100 (h). The image processing apparatus 100 sends the processing result acquired from the processing execution server 200 to the management server 300 (i). At this time, in a case where the additional information is added to the processing result, the image processing apparatus 100 may execute processing for the processing result acquired from the processing execution server 200 based on the acquired additional information. For example, in a case where the information on the storage destination of the processing result is added to the processing result as the additional information, the image processing apparatus 100 transmits the processing result to the storage destination based on the additional information.

As described above, in the present exemplary embodiment, in a case where the image processing apparatus 100 accesses the processing execution server 200, the processing execution server 200 issues the job ID and the job ID is shared between the image processing apparatus 100 and the processing execution server 200. Then, the image processing apparatus 100 adds the job ID to the data to be transmitted to the processing execution server 200 in the first job and the transmission request to acquire the processing result in the second job. As a result, the processing execution server 200 recognizes that the data to be processed, which is received in advance, and the processing result transmission request received later are due to the related jobs.

Further, the image processing apparatus 100 makes an inquiry about the completion of the processing to the processing execution server 200 after transmitting the data to be processed to the processing execution server 200. In a case where the processing execution server 200 responds to the inquiry, the processing execution server 200 can provide the notification that the processing is completed to the image processing apparatus 100 over the firewall 400, and the image processing apparatus 100 can recognize that the processing is completed in the processing execution server 200. As long as the inquiry can pass through the firewall 400 in such a way that the processing execution server 200 responds, a method is not particularly limited. As an example, in a case where long polling is used as described above, complexity of repeating the inquiry many times until the image processing apparatus 100 receives the response from the processing execution server 200 as in normal polling can be suppressed.

Operation of Information Processing Apparatus

Figure 5:
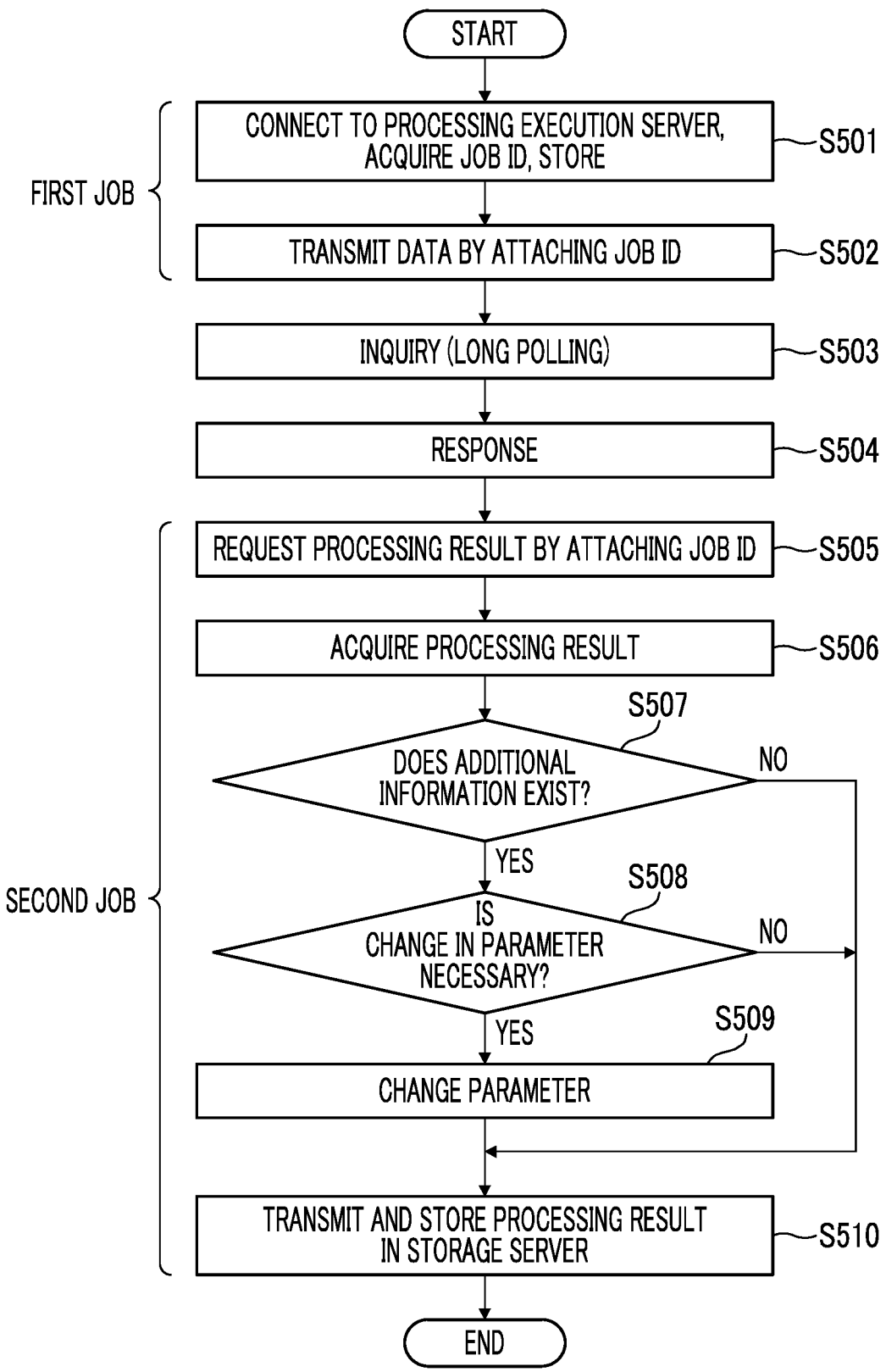
FIG. 5 is a flowchart showing an operation of an information processing apparatus.

FIG. 5 is a flowchart showing an operation of the information processing apparatus 100. In an operation example, the above-described form data will be described as an example of data to be processed. The image processing apparatus 100 as the information processing apparatus 100 first connects to the processing execution server 200, acquires and stores the job ID from the processing execution server 200 (S501). The acquired job ID is stored in, for example, the storage unit 120 shown in FIG. 2. Next, the image processing apparatus 100 attaches the acquired job ID to the form data to be processed and transmits the form data to the processing execution server 200 (S502). As a result, data processing is started in the processing execution server 200. The above operation corresponds to an operation of the first job by the information processing apparatus 100.

Next, the image processing apparatus 100 makes the inquiry about the completion of the processing to the processing execution server 200 (S503). The inquiry is made by, for example, long polling. In a case where the response to the inquiry is accepted from the processing execution server 200 (S504), the image processing apparatus 100 attaches the job ID acquired in S501 to the processing result transmission request and transmits the resulting processing result transmission request to the processing execution server 200 (S505). Then, the image processing apparatus 100 acquires the processing result from the processing execution server 200 (S506). The operation subsequent to the processing result transmission request shown in S505 corresponds to the operation of the second job by the information processing apparatus 100.

Next, the image processing apparatus 100 determines whether or not additional information is added to the acquired processing result. Here, information indicating the storage destination of the processing result is added as the additional information. For example, in a case where a path of the management server 300 is specified as the storage destination according to a type of the form to be processed or in a case where the storage destination is recorded in a document of the form, the processing execution server 200 specifies the storage destination of the processing result in the processing result of the form data. In such a case, the information on the storage destination specified by the data processing is added to the processing result as the additional information.

In a case where the additional information is added to the processing result (YES in S507), the image processing apparatus 100 determines whether or not a parameter needs to be changed in processing to be executed for the processing result of the processing execution server 200 based on the additional information. For example, in the example in which the information on the storage destination is added, in a case where only the management server 300 is determined to be related to the storage destination and the path of the management server 300 is specified by the additional information, addition of the path is necessary as the parameter in the information on the storage destination. Further, in a case where the path of the management server 300 is determined to be related to the storage destination in advance but the path specified by the additional information is different from a predetermined path, a change in the path is necessary as the parameter in the information on the storage destination. On the other hand, in a case where the path of the management server 300 is determined to be related to the storage destination in advance and the path specified by the additional information is identical with the predetermined path, the change in the path is not necessary as the parameter in the information on the storage destination.

In a case where the change in the parameter is necessary (YES in S508), the image processing apparatus 100 changes the corresponding parameter based on the additional information (S509). Then, the image processing apparatus 100 transmits and stores the processing result to the management server 300, which is a storage server, according to the changed parameter (S510). Further, in a case where the additional information is not added to the processing result acquired from the processing execution server 200 (NO in 5507) and in a case where the parameter does not need to be changed based on the additional information (NO in S508), the image processing apparatus 100 transmits and stores the processing result in the management server 300 according to original setting (S510).

Operation of Processing Execution Server

Figure 6:
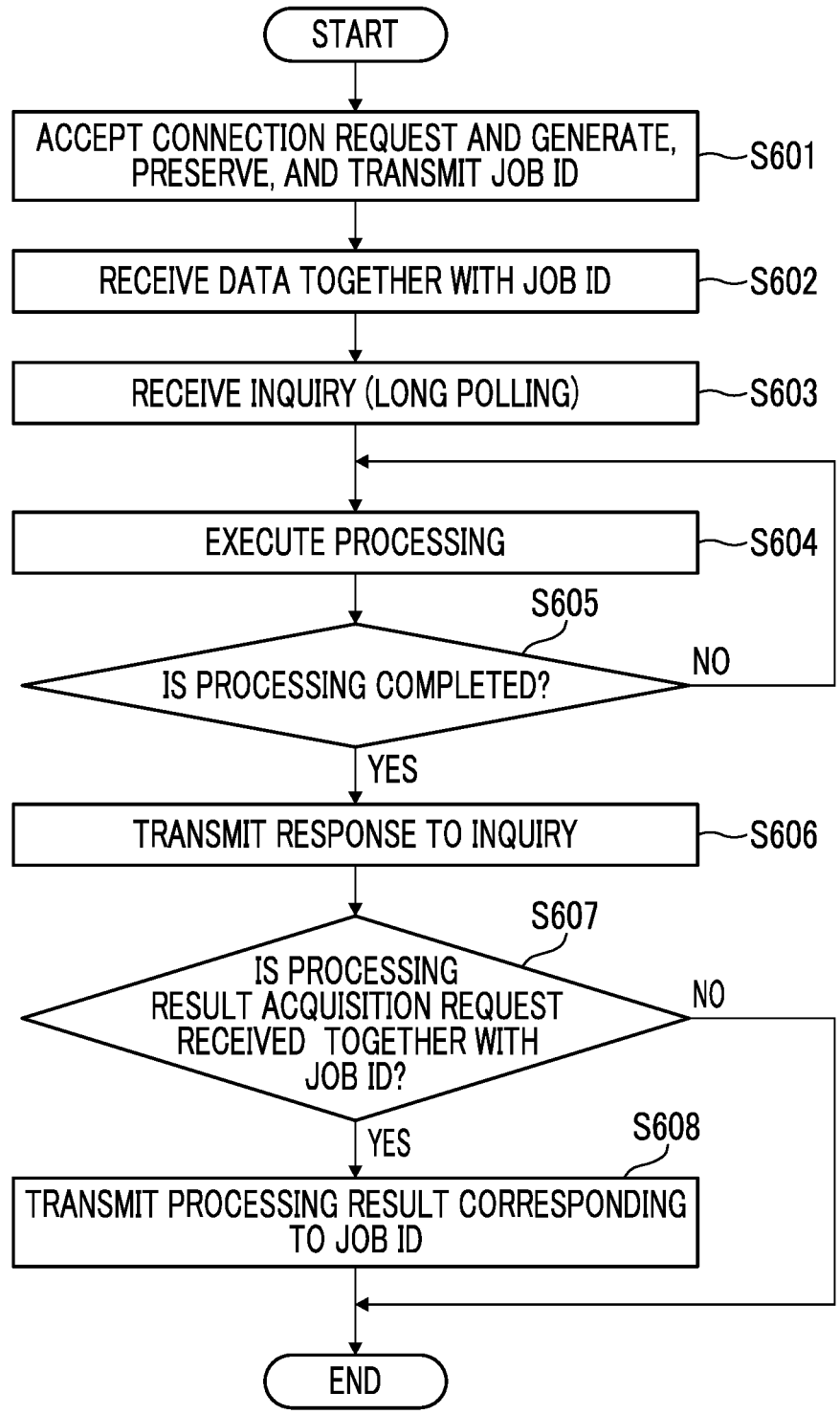
FIG. 6 is a flowchart showing an operation of processing execution.

FIG. 6 is a flowchart showing an operation of the processing execution server 200. In a case where the processing execution server 200 accepts the connection request from the image processing apparatus 100, the processing execution server 200 generates and stores the job ID, and transmits the generated job ID to the image processing apparatus 100 (S601). Thereafter, the processing execution server 200 receives the form data to be processed, to which the job ID is added from the image processing apparatus 100 (S602). Further, the processing execution server 200 accepts an inquiry about the completion of processing from the image processing apparatus 100 (S603).

The processing execution server 200 executes processing on the received form data (S604), and, in a case where the processing is completed, transmits a response to the inquiry accepted in 5603 to the image processing apparatus 100 (S605 and S606). Thereafter, in a case where the processing execution server 200 receives a processing result acquisition request, to which the job ID generated in S601 is added, from the image processing apparatus 100 (YES in S607), the processing execution server 200 transmits the processing result corresponding to the received job ID to the image processing apparatus 100 (S608).

On the other hand, in a case where the processing result does not need to be transmitted to the image processing apparatus 100, the processing execution server 200 ends the processing because the processing result transmission request is not transmitted from the image processing apparatus 100 (NO in S607). The case where the processing result does not need to be transmitted to the image processing apparatus 100 is a case where the image processing apparatus 100 does not perform processing on the processing result of the processing execution server 200. For example, the above case includes a case where the processing result is held in the processing execution server 200 without returning to the image processing apparatus 100, or a case where the processing result is stored in a server provided outside the firewall 400 (the same side as the processing execution server 200). Whether or not the processing result needs to be transmitted to the image processing apparatus 100 is predetermined, and includes a case of being designated in a case where the form data to be processed is received and a case of being specified as a result of the data processing.

Response to Change in Shared Information

In the present exemplary embodiment, the information processing apparatus 100 executes the operation of sending the data to be processed to the processing execution server 200 as the first job and the operation of acquiring the processing result from the processing execution server 200 as the second job, and executes the operations as separate jobs. Then, after the first job ends, the image processing apparatus 100 can release a resource, such as a memory area, used for executing the job and can use the resource to execute another processing. Here, a case is considered where an operation of changing the shared information (information shared by a plurality of users) is performed in the image processing apparatus 100 between execution of the first job and start of the second job.

The shared information is stored in the storage unit 120 (see FIG. 2) of the image processing apparatus 100. The shared information includes, for example, a shared address book or the like. As described above, since the resource of the image processing apparatus 100 is released after the first job ends, the user can change the stored data by accessing the storage unit 120 except for the data whose editing is restricted. Hereinafter, as an example of editing the shared information, a change in an address recorded in the shared address book will be described as an example.

As a specific situation, a case is considered where the information on the storage destination of the processing result acquired in the second job is added to the data transmitted to the processing execution server 200 in the first job and the storage destination is designated by information of the shared address book. Specifically, for example, a registration number in the address book in which the address corresponding to the storage destination of the processing result is recorded is added to the transmission data. Then, after the first job ends, the address registered in the registration number of the address book corresponding to the additional information of the transmission data is changed. In this case, in a case where the image processing apparatus 100 acquires the processing result by the second job, the image processing apparatus 100 searches the address book based on the additional information and transmits the processing result using the address registered with the relevant registration number as a transmission destination. However, since the address of the relevant registration number in the address book has been changed, the processing result is sent to a transmission destination different from the transmission destination assumed when the first job is executed.

In order to eliminate the above-described inconvenience, the image processing apparatus 100 temporarily stores the shared information used in the first job in a management table, and uses information stored in the management table in the second job. The management table is an example of a primary storage section. Describing with an example of the address book, in a case where the additional information is added to the transmission data in the first job, the image processing apparatus 100 associates the registration number of the address book, which is the additional information, with identification information of the job, and records an association result in the management table. Then, even in a case where the address book is rewritten, the information in the management table, which corresponds to the rewritten information, is maintained as content before being rewritten. The identification information of the job recorded in the management table may be the job ID given to the first job by the processing execution server 200, or the file name of the data to be processed, the user ID, or the like may be used.

Figure 7:
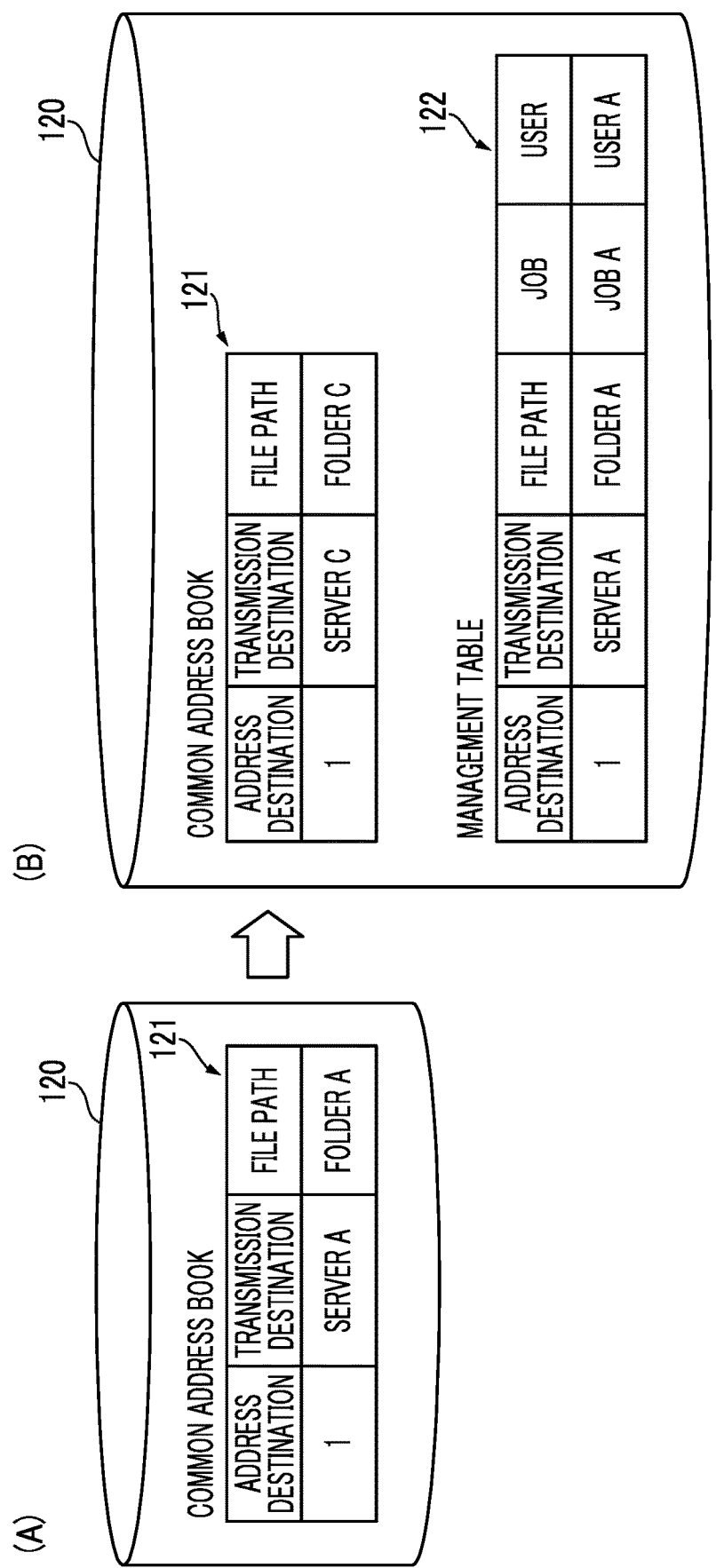
FIG. 7 is a diagram showing a relationship between a shared address book and a management table, a part (A) in FIG. 7 is a diagram showing content of the address book before change, and a part (B) in FIG. 7 is a diagram showing content of the address book after the change and the management table.

FIG. 7 is a diagram showing a relationship between the shared address book and the management table. A part (A) in FIG. 7 is a diagram showing content of the address book before the change, and a part (B) in FIG. 7 is a diagram showing content of the address book after the change and the management table. Here, the shared address book (described as "common address book" in FIG. 7) 121 and the management table 122 are held in the storage unit 120 shown in FIG. 2.

In examples shown in the part (A) and the part (B) in FIG. 7, information on each of items including "address number", "transmission destination", and "file path" is recorded in the address book 121 for each record. In "address number", a registration number of data in the address book is recorded. In "transmission destination", information on a server in the transmission destination of the data to be processed is recorded. In the information on the server, the server may be specified, and, for example, a server name, an address, or the like is registered. In "file path", the division of a storage location of a data file of the server in the transmission destination is recorded. In the part (A) and the part (B) in FIG. 7, only one record is described in the address book 121 for the sake of simplicity, but a plurality of records may be registered in reality.

Further, in the example shown in the part (B) in FIG. 7, information on each of items including "address number", "transmission destination", "file path", "job", and "user" is recorded in the management table 122 for each record. In a case where "address number", "transmission destination", and "file path" in the items are the same as the respective relevant items in the address book 121 and a record of the management table 122 is created, the information recorded in the relevant address number in the address book 121 is registered. In "job", information on the first job triggered the creation of the record of the management table 122 is recorded. The information on the first job may specify a job, may be, for example, a local ID given by the image processing apparatus 100, and may use a job ID for guaranteeing cooperation of jobs given by the processing execution server 200. In "user", user information indicating a user who executes the first job triggered the creation of the record of the management table 122 in the image processing apparatus 100 is recorded. In the user information, the user may be specified, and, for example, a user name, a user ID, or the like is registered. At the part (B) in FIG. 7, only one record is described in the management table 122 for the sake of simplicity, but, a record is created each time, at which the first job is executed, and information is registered in the management table 122.

In a case where the address book 121 is in a state of the part (A) in FIG. 7, a user A performs the first job in the image processing apparatus 100, and the image processing apparatus 100 adds an address number "1" of the address book 121 to the data (transmission data) to be processed, as the additional information indicating a storage destination of a processing result, and transmits the additional information to the processing execution server 200. At this time, in the address book 121, "server A" as the transmission destination and "folder A" as the file path are recorded in a record of the address number "1". Therefore, the user A intends to store the processing result by the processing execution server 200 in the folder A of the server A which is the management server 300.

The image processing apparatus 100 creates the record of the management table 122 in association with the execution of the first job, and registers information recorded in the record of the address number "1" added to the transmission data in the created record. Further, the image processing apparatus 100 records identification information of the first job and information of the user A in the created record of the management table 122. In the record of the address number "1" of the management table 122 shown in the part (B) in FIG. 7, "server A" is recorded as the transmission destination, "folder A" is recorded as the file path, "job A" is recorded as the identification information of the job, and "user A" is recorded as the user information. The first job is performed after user authentication, and the information of the user A specified by an authentication result is recorded in the management table 122.

Next, before the second job related to the first job (job A) is executed, information on a record of the address number "1" in the address book 121 is rewritten by a user different from the user A. In the record of the address number "1" of the address book 121 shown in the part (B) in FIG. 7, the transmission destination is rewritten to "server C" and the file path is rewritten to "folder C". On the other hand, the information on the record of the address number "1" in the management table 122 remains in a state before being rewritten.

In the state, in the image processing apparatus 100, the second job related to the first job (job A) is executed by the user A, and a processing result by the processing execution server 200 is acquired. The additional information indicating the storage destination added to the transmission data in the first job is added to the processing result. The image processing apparatus 100 extracts the address number "1" from the acquired additional information of the processing result, and searches for the transmission destination of the processing result. At this time, the image processing apparatus 100 searches the management table 122 instead of the address book 121. Then, the image processing apparatus 100 sends the processing result to the searched storage destination. As a result, the data of the processing result by the processing execution server 200 is stored in the folder A of the server A intended by the user A when the first job is executed.

In the above-described example, the record of the management table 122 is created each time the first job is executed. Therefore, for example, in a case where there are a plurality of first jobs of adding the address number of the identical record in the address book 121 to the data to be processed as the additional information, records corresponding to the respective jobs are individually created. As a specific example, a case is considered where the additional information, in which the address number "1" of the address book 121 shown in FIG. 7 is recorded, is added as the information indicating the storage destination of the processing result in each of the job A, job B, and job C which are the first jobs. In this case, in a case where the respective jobs are executed, a record in which "job A" is registered in the job item, a record in which "job B" is registered in the job item, and a record in which "job C" is registered in the job item are created, respectively in the management table 122. Therefore, even in a case where there are a plurality of records in which the identical address number is recorded in the management table 122, a record to be referred to as the storage destination of the second job is specified by referring to the information on the job registered in the job item.

Further, a case is considered where a change in the address book 121 is performed a plurality of times while the job A, the job B, and the job C are executed. As a specific example, in the record of the address number "1" in the address book 121, initially, the transmission destination is "server A" and the file path is "folder A", as shown in the part (A) in FIG. 7. Then, after the execution of the job A, the transmission destination is rewritten to "server B" and the file path is rewritten to "folder B" in the record of the address number "1". Further, after the execution of the job B, the transmission destination is rewritten to "server C" and the file path is rewritten to "folder C" in the record of the address number In this case, in the management table 122, in the record registered with the job item "job A", "server A" is recorded in the transmission destination and "folder A" is recorded in the file path. Then, in the record created after the first change in the address book 121 and registered with the job item "job B", "server B" is recorded in the transmission destination and "folder B" is recorded in the file path. Further, in the record created after the second change in the address book 121 and registered with the job item "job C", "server C" is recorded in the transmission destination and "folder C" is recorded in the file path. Therefore, in the second job corresponding to the job A, the data of the processing result is stored in the folder A of the server A. Further, in the second job corresponding to the job B, the data of the processing result is stored in the folder B of the server B. Further, in the second job corresponding to the job C, the data of the processing result is stored in the folder C of the server C.

Response to Change in Shared Information by Identical User

In the above-described example, the address book 121 is rewritten by a user different from the user A who executes the first job and the second job. On the other hand, in a case where the record corresponding to the address book is rewritten by the user A, it can be said that the storage destination of the processing result is changed by the intention of the user A. Therefore, in this case, unlike the above-described example, it is conceivable that relevant information of the management table 122 is also changed.

Here, the user may be identified by, for example, the user authentication when the address book 121 is changed. Specifically, first, the user authentication is performed when the first job is executed, and the user information is recorded in the created record of the management table 122. Here, the user A performs the first job. Next, in a case where the user who intends to change the address book 121 performs a user authentication operation and an authentication result is the user A, the image processing apparatus 100 recognizes that the change in the address book 121 is an operation by the user A. On the other hand, in a case where the authentication result is not the user A, the image processing apparatus 100 recognizes that the change in the address book 121 is an operation by a user other than the user A. In a case where the user who intends to change the address book 121 does not perform the user authentication operation, in other words, in a case where the user who does not pass the user authentication intends to change the address book 121, the image processing apparatus 100 recognizes the change in the address book 121 is an operation by a user other than user A.

Figure 8:
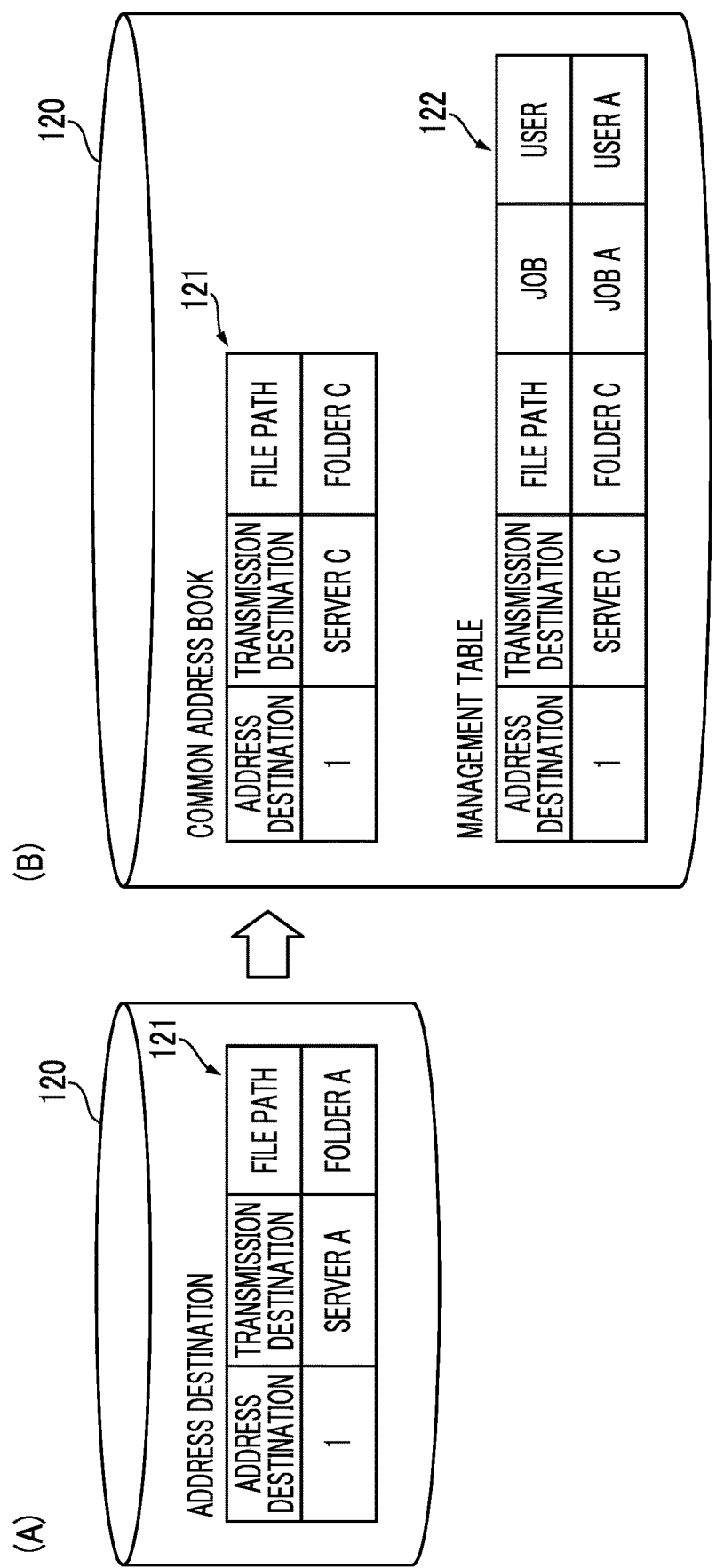
FIG. 8 is a diagram showing a relationship between the shared address book and the management table in a case where the same user as an execution user of the first job changes the shared address book, a part (A) in FIG. 8 is a diagram showing content of the address book before change, and a part (B) in FIG. 8 is a diagram showing content of the address book after the change and the management table.

FIG. 8 is a diagram showing a relationship between the shared address book and the management table in a case where the same user as an execution user of the first job changes the shared address book. A part (A) in FIG. 8 is a diagram showing content of the address book before the change, and a part (B) in FIG. 8 is a diagram showing content of the address book after the change and the management table. In an example shown FIG. 8, the execution of the first job, the rewriting of the address book 121, and the execution of the second job are performed in the same manner as in the example described with reference to FIG. 7. However, unlike the example described with reference to FIG. 7, the rewriting of the address book 121 is performed by the user A the same as the user who has executed the first job and the second job.

In the example shown in FIG. 8, in a case where the first job (job A) is executed, the transmission destination is "server A" and the file path is "folder A" in the registration information of the address number "1" in the address book 121, as shown in the part (A) in FIG. 8. Then, by rewriting the address book 121, in the registration information of the address number "1" of the address book 121, the transmission destination is changed to "server C" and the file path is changed to "folder C", as shown in the part (B) in FIG. 8.

Further, since the rewriting of the address book 121 is rewriting by the user A who has executed the first job (job A), the transmission destination is changed to "server C" and the file path is changed to "folder C" in the registration information of the address number 1 of the management table 122, as shown in the part (B) in FIG. 8.

In this state, in the image processing apparatus 100, the second job related to the first job (job A) is executed by the user A, and the processing result by the processing execution server 200 is acquired. Then, the image processing apparatus 100 extracts the address number "1" from the additional information of the acquired processing result, searches the management table 122 for the transmission destination of the processing result, and sends the processing result to the searched storage destination. Therefore, the data of the processing result by the processing execution server 200 is stored in the folder C of the server C, which is the storage destination changed by the user A after the execution of the first job.

In the above-described example, in a case where the address book 121 is changed by the user who executed the first job, the image processing apparatus 100 immediately reflects the changed contents in the management table 122. On the other hand, in a case where the address book 121 is changed by the user who executed the first job, the image processing apparatus 100 may make an inquiry about whether or not to reflect the changed content in the management table 122 to the user. The inquiry is made, for example, by displaying a message on the display unit 140 shown in FIG. 2. In a case where the user inputs an instruction to reflect the changed content, the image processing apparatus 100 reflects the changed content of the address book 121 in the management table 122 (see the part (B) in FIG. 8). On the other hand, in a case where the user inputs an instruction not to reflect the changed content, the image processing apparatus 100 holds the content of the management table 122 regardless of the change in the address book 121 (see the part (B) in FIG. 7).

Figure 9:
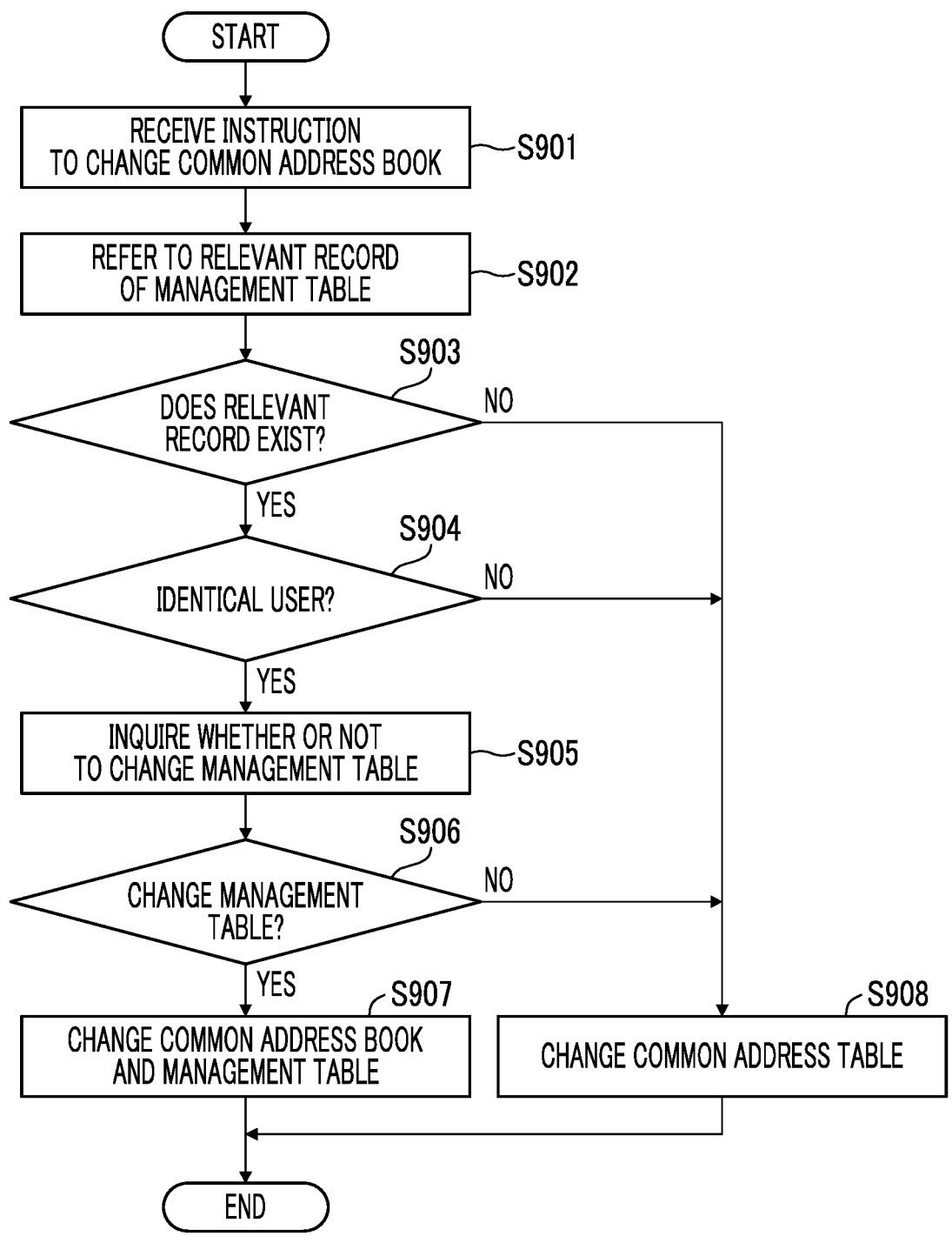
FIG. 9 is a flowchart showing an operation of the image processing apparatus in a case where the shared address book is changed.

FIG. 9 is a flowchart showing an operation of the image processing apparatus 100 in a case where the shared address book 121 is changed. In an operation example, in a case where the address book 121 is changed by the user who has executed the first job, the image processing apparatus 100 makes an inquiry about whether or not to reflect the changed content in the management table 122 to the user.

In a case where the image processing apparatus 100 accepts an instruction to change the address book 121 (described as "common address book" in FIG. 9) after the first job is performed (S901), the image processing apparatus 100 refers to the management table 122 and checks whether or not a relevant record (described as "relevant record" in FIG. 9) exists (S902). The relevant record is a record, in which information recorded in a record to be changed in the address book 121 is registered, among the records of the management table 122. In a case where the relevant record does not exist (NO in S903), the image processing apparatus 100 changes the record to be changed in the address book 121 and ends the process (S908).

On the other hand, in a case where the relevant record exists (YES in S903), the image processing apparatus 100 subsequently determines whether or not the user who performed the operation of changing the address book 121 is identical to the user who executed the first job. In a case of different users (NO in S904), the changed content of the address book 121 is not reflected in the management table 122, so that the image processing apparatus 100 changes only the record to be changed in the address book 121 and ends the process (S908).

On the other hand, in a case of an identical user (YES in S904), the image processing apparatus 100 makes an inquiry about whether or not to change the management table 122 to the user (S905). In a case where an instruction to change is accepted by the user (YES in S906), the image processing apparatus 100 changes the address book 121 and changes the management table 122 by reflecting the changed content (S907). On the other hand, in a case where the user accepts an instruction not to change (NO in S906), the image processing apparatus 100 does not change the management table 122, changes only the record to be changed in the address book 121, and ends the process (S908).

Reflection of Change in Shared Information Based on Processing Result of Processing Execution Server In a case of requesting the processing execution server 200 to perform processing for the data to be processed, the storage destination of the processing result may be confirmed by a result of execution of the processing by the processing execution server 200. For example, a type of document data to be processed may be specified by the result of analysis processing by the processing execution server 200 so that a storage location of the document is confirmed according to the type, or the storage destination may be described in a letter of the document data to be processed so that the data is read through the analysis by the processing execution server 200. In such a case, the storage destination of the processing result is determined according to information obtained from the data to be processed by the processing of the processing execution server 200.

Here, in a case where the information on the storage destination of the processing result is added to the data of the processing target transmitted in the first job, the additional information may be different from the information on the storage destination confirmed by the processing of the processing execution server 200. In other words, the information recorded in the relevant record in the management table 122 may be different from the information obtained from the data to be processed by the processing of the processing execution server 200. In such a case, in principle, it is conceivable to give priority to the information obtained from the data to be processed.

Further, the response in the image processing apparatus 100 may be changed depending on whether the information of the management table 122 (hereinafter, referred to as "first information") is inconsistent with the information obtained from the data to be processed by the processing of the processing execution server 200 (hereinafter, referred to as "second information"). A case where the first information is inconsistent with the second information is, for example, a case where the first information and the second information designate different servers or paths as the information indicating the storage destination of the processing result.

On the other hand, a case where the first information is not inconsistent with the second information is a case where one of the first information and the second information has a relationship including content of the other information. For example, a case may be provided where one of the first information and the second information designates a path lower than a path of the other as the information indicating the storage destination of the processing result. Specifically, a case may be provided where the folder A of the server A is designated in the first information as shown in the part (A) in FIG. 7 and a subfolder provided in the folder A of the server A is designated in the second information.

In a case where the first information is inconsistent with the second information, for example, the image processing apparatus 100 makes an inquiry about which information to be used to the user, and uses information specified by the user. The inquiry is made, for example, by displaying a message on the display unit 140 shown in FIG. 2. On the other hand, in a case where the first information is not inconsistent with the second information, the image processing apparatus 100 gives priority to the second information which is the information obtained from the data to be processed. In addition, information for giving priority may be specified according to a type of information. For example, in the case of the information on the storage destination, priority may be given to the information that designates the lower path.

In a case where the first information is different from the second information and the priority is given to the second information, the image processing apparatus 100 may simply give the priority to the information which is the second information acquired from the processing execution server 200 to use the information, regardless of the information which is the first information recorded in the management table 122. Further, the image processing apparatus 100 may update the information of the management table 122 based on the second information, and may use the updated information of the management table 122.

Figure 10:
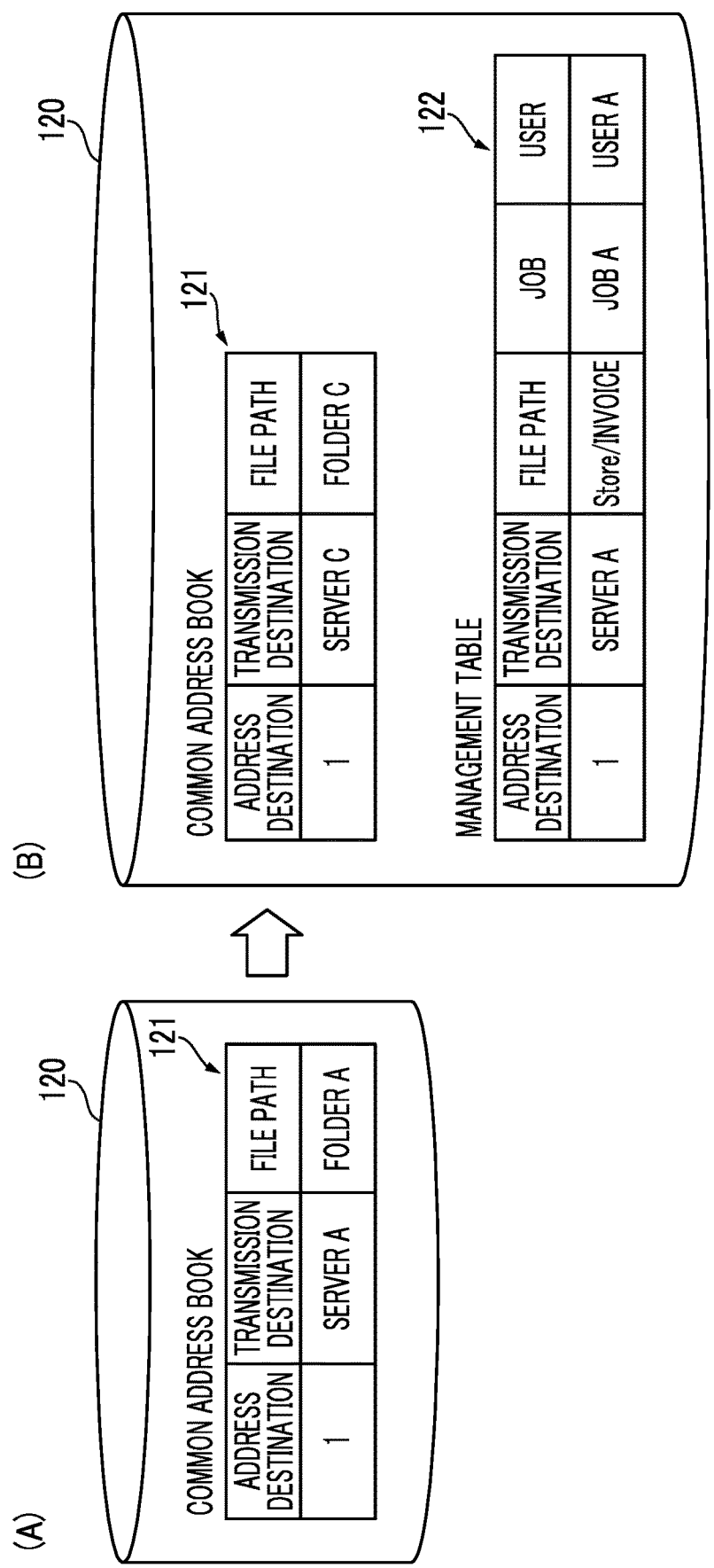
FIG. 10 is a diagram showing a state in which information in the management table is updated using information acquired from the processing execution server, a part (A) in FIG. 10 is a diagram showing a state before updating the management table, and a part (B) in FIG. 10 is a diagram showing a state after the update.

FIG. 10 is a diagram showing a state in which the information of the management table 122 is updated using the information acquired from the processing execution server 200. A part (A) in FIG. 10 is a diagram showing a state before the update of the management table 122, and a part (B) in FIG. 10 is a diagram showing a state after the update. The address book 121 is changed after execution of first job, and the address book 121 and the management table 122 are in the state shown in the part (B) in FIG. 10 at a stage before the execution of the second job. Then, the information on the storage destination is added to information on the processing result acquired from the processing execution server 200 in the second job. Further, in the additional information, a folder "invoice" set in the storage device "store" of the server A as the storage destination is designated as the storage destination.

In the example shown in FIG. 10, in a case where the image processing apparatus 100 executes the second job and acquires the additional information from the processing execution server 200, the image processing apparatus 100 updates the item of the file path in the relevant record of the management table 122 based on the additional information. Here, information on the item of the file path is changed to information "store/invoice" indicating the folder "invoice" of the storage device "store". Thereafter, the image processing apparatus 100 stores the processing result by the processing execution server 200 in the storage destination specified by information on an updated record of the management table 122.

Other Application Examples

In the above-described exemplary embodiment, an example of transmitting the processing result by the processing execution server 200 to the management server 300 has been described as the second job, but the second job is not limited to the above-described processing. The present exemplary embodiment may be applied to various processing performed in which an operation until the data to be processed is transmitted to the processing execution server 200 and an operation after the processing result is acquired by the processing execution server 200 are performed as separate jobs in a case where a part of a series of processing by the information processing apparatus 100 is requested to the processing execution server 200.

As an example, a case is considered where the image processing apparatus 100 as the information processing apparatus 100 sends an image to the processing execution server 200 to execute image processing, and returns a processed image to the image processing apparatus 100 for print output. The image processing apparatus 100 has a plurality of trays for holding papers of different sizes as a print medium, and can select the trays according to the size of the paper to be printed. Setting information indicating a relationship between each tray and the type of paper to be held is held in, for example, the storage unit 120 (see FIG. 2) as the shared information.

In the first job, the image processing apparatus 100 adds the additional information to the image to be processed and transmits the image to the processing execution server 200, thereby requesting image processing. The additional information is recorded with identification information of the tray that holds the paper used for printing an image of the processing result.

To give a specific example, when the first job is executed, a tray 1 holds A4 paper, a tray 2 holds A3 paper, and a tray 3 holds A5 paper, and the identification information of the tray 1 is added to the image to be processed, as the additional information in the first job.

Here, after the execution of the first job, tray setting of the shared information is changed, so that the type of paper held in each tray is changed. At this time, the image processing apparatus 100 registers information, in which each tray before and after the setting is changed is associated with the size of the paper held by each tray, in a tray management table (not shown) as the example of the primary storage section.

In the above example, the tray setting is changed so that the tray 1 holds A5 paper, the tray 2 holds A3 paper, and the tray 3 holds A4 paper. In this case, information indicating that the tray 1 holds A4 paper before change and holds A5 paper after change, information indicating that the tray 2 holds A3 paper before change and holds A3 paper after change, and information indicating that the tray 3 holds A5 paper before change and holds A4 paper after change are registered in a record associated with each tray in the tray management table. Further, as described with reference to FIGS. 7 to FIG. 9, the tray management table is registered with the information on the job for specifying a job that requires information on each record, and the user information.

Next, in the second job, the image processing apparatus 100 acquires the image of the processing result from the processing execution server 200. The additional information indicating the tray added to the transmission data in the first job is added to the processing result. The image processing apparatus 100 specifies the designated tray based on the additional information, and refers to the relevant record in the tray management table. Then, the image processing apparatus 100 determines which tray holds the paper held in the tray specified by the additional information when the first job is executed is held after the setting is changed, based on information on the referenced record. Then, the image processing apparatus 100 uses the paper in the specified tray to perform the print output in the second job.

In the above example, tray information obtained from the additional information of the processing result is "tray 1". The image processing apparatus 100 refers to the tray management table and recognizes that the A4 paper, which has been held in the tray 1, is held in the tray 3 after the setting is changed. Therefore, the image processing apparatus 100 prints out the image of the processing result by the processing execution server 200 using the paper in the tray 3.

As described above, the present exemplary embodiment may be applied to various processing performed in the first job and the second job in a case where a part of a series of processing by the information processing apparatus 100 is requested to the processing execution server 200.

Hereinabove, although the exemplary embodiment of the present invention has been described, the technical scope of the exemplary embodiment of the present invention is not limited to the above-described exemplary embodiment. For example, in the exemplary embodiment described with reference to FIG. 7 to FIG. 9, the shared information recorded in the additional information is held in the primary storage section when the first job is executed. On the other hand, as described in the above-described application example, in a case where the shared information is changed, the shared information to be changed may be held in the primary storage section.

Further, in the above-described exemplary embodiment, a case is assumed where the shared information held in the storage device (storage unit 120) provided in the information processing apparatus 100 is changed, and the primary storage section holds the information before the change. On the other hand, the present exemplary embodiment may also be applied in a case where the shared information recorded in the external storage device of the information processing apparatus 100 is used. Also in this case, when the first job is executed or the shared information is changed, the shared information recorded in the additional information and the shared information to be changed may be held in the primary storage section and may be used in the second job. In the exemplary embodiment, as the primary storage section, the storage device (storage unit 120) of the information processing apparatus 100 may be used, or an external storage device may be used. In addition, various changes and substitutions of configurations that do not depart from the scope of the technical idea of the present invention are included in the present invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
 as a first job, perform connection to an external server that is enable to be connected from the information processing apparatus, instruct the external server to execute processing by designating shared information held in a storage device that is enable to be shared by a plurality of jobs, hold the designated shared information in a primary storage section, and release a resource used in the first job;
 as a second job different from the first job, acquire a result of the processing by the external server, and execute processing using the shared information designated in the first job and held in the primary storage section; and
 change the shared information held in the storage device and not change the shared information held in the primary storage section in a case where an operation of changing the shared information is performed between execution of the first job and start of the second job.

2. The information processing apparatus according to claim 1, wherein the processor is configured to:
 perform user authentication in a case where the first job is executed and in a case where a change operation of the shared information is accepted, and
 change the shared information held in the storage device and the shared information held in the primary storage section according to the change operation in a case where an identical user performs the first job and the change operation.

3. The information processing apparatus according to claim 2, wherein the processor is configured to:
 make an inquiry whether or not to change the shared information held in the primary storage section according to the change operation to the user in a case where the identical user performs the first job and the change operation of the shared information, and
 change the shared information of the primary storage section in a case where an instruction to change is accepted.

4. The information processing apparatus according to claim 1, wherein the processor is configured to:
 in the first job, transmit, as the shared information, instruction information for specifying a transmission destination of a processing result by the external server and data to be processed to the external server, and hold the instruction information and information on the transmission destination specified by the instruction information in the primary storage section, and
 in the second job, receive data of a processing result for the data to be processed and the instruction information from the external server, acquire the information on the transmission destination from the primary storage section based on the instruction information, and transmit the data of the processing result to the transmission destination based on the acquired information.

5. The information processing apparatus according to claim 4, wherein the processor is configured to:
 in a case where the information on the transmission destination created by the external server is added to the data of the processing result received from the external server in the second job,
 transmit the data of the processing result based on the information on the transmission destination created by the external server in a case where the information on the transmission destination acquired from the primary storage section is not inconsistent with the information on the transmission destination created by the external server based on the instruction information, and
 make an inquiry about the transmission destination of the data of the processing result to the user in a case where the information on the transmission destination acquired from the primary storage section is inconsistent with the information on the transmission destination created by the external server based on the instruction information.

6. A non-transitory computer readable medium storing a program causing a computer to execute a process comprising:
 as a first job, performing connection to an external server that is enable to be connected from the information processing apparatus, instructing the external server to execute processing by designating shared information held in a storage device that is enable to be shared by a plurality of jobs, holding the designated shared information in a primary storage section, and releasing a resource used in the first job;
 as a second job different from the first job, acquiring a result of the processing by the external server, and executing processing using the shared information designated in the first job and held in the primary storage section; and
 changing the shared information held in the storage device and not changing the shared information held in the primary storage section in a case where an operation of changing the shared information is performed between execution of the first job and start of the second job.

7. An information processing method comprising:
 as a first job, performing connection to an external server that is enable to be connected from the information processing apparatus, instructing the external server to execute processing by designating shared information held in a storage device that is enable to be shared by a plurality of jobs, holding the designated shared information in a primary storage section, and releasing a resource used in the first job;
 as a second job different from the first job, acquiring a result of the processing by the external server, and executing processing using the shared information designated in the first job and held in the primary storage section; and
 changing the shared information held in the storage device and not changing the shared information held in the primary storage section in a case where an operation of changing the shared information is performed between execution of the first job and start of the second job.

* * * * *